United States Patent [19]
Sobajima et al.

[11] 3,846,008
[45] Nov. 5, 1974

[54] MEASUREMENT MICROSCOPE
[75] Inventors: Masaru Sobajima; Jinichi Kato, both of Tokyo, Japan
[73] Assignee: Nippon Kogaku K.K., Tokyo, Japan
[22] Filed: Sept. 26, 1973
[21] Appl. No.: 401,077

[30] Foreign Application Priority Data
Sept. 30, 1972 Japan.............................. 47-98184

[52] U.S. Cl.................... 350/10, 356/171, 356/247, 33/298
[51] Int. Cl. ........................................... G02b 27/36
[58] Field of Search ........ 350/10, 81; 356/171, 247; 33/246, 297, 298; 73/81-83

[56] References Cited
UNITED STATES PATENTS
2,942,345   6/1960   Goldberg.......................... 350/10 X Primary Examiner—David H. Rubin
Attorney, Agent, or Firm—Fitzpatrick, Cella, Harper & Scinto

[57] ABSTRACT

In a measurement microscope comprising an eyepiece assembly including an eyepiece and a microscope body tube having an objective relative to which the eyepiece assembly is rotatable, the eyepiece assembly comprises an outer frame for securing the eyepiece therein, a movable member connected to the outer member for sliding movement relative to and within the outer frame in a first direction perpendicular to the optical axis of the eyepiece, and intermediate frame connected to the movable member for movement relative to the movable member in a second direction perpendicular to the optical axis, and an inner frame connected to the intermediate frame for movement relative to the intermediate frame in the second direction. The intermediate and inner frames are provided with respective transparent scale plates, which have scale marks formed so as to register with the focal plane of the objective in which the image of a sample is formed. These scale marks are arranged in orthogonal directions forming an angle of 45° with the first and second directions. The movable member, the intermediate and the inner frame are adjustable and movable by means of extraneously operable knobs.

2 Claims, 6 Drawing Figures

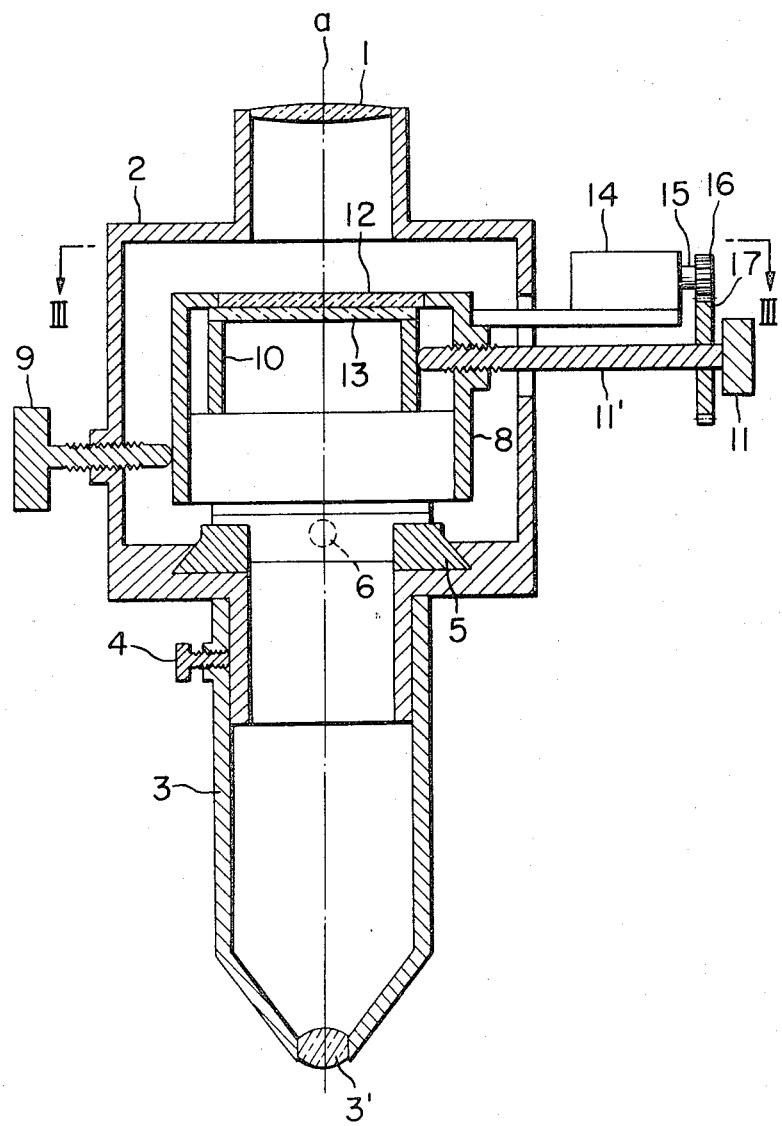

MEASUREMENT MICROSCOPE

BACKGROUND OF THE INVENTION

1. Field of the Invention

This invention relates to microscopes, and more particularly to microscopes for measuring lengths in two directions at right angles to each other, such as the measurement of a depression in sample or specimen subjected to Vickers' or Brinell hardness tests, and which enables such measurement to be effected quickly.

2. Description of the Prior Art

To know the hardness of a metal or like material, Vickers' or Brinell hardness tests have been adopted which involve the steps of forming a depression in the surface of a test sample or specimen to be measured by the use of a press member formed of diamond or steel, and then measuring the diagonal lengths or diameters across such depression thereby to obtain the hardness of the sample material. Highly accurate measurement of the diagonal lengths or diameters across the depression so formed is a critical factor in such tests. In high-temperature hardness meters, quick measurement procedures are required in addition to high accuracy. As a device for measuring the diagonal lengths or diameters of the depression as described above, measurement microscopes are used. These comprise a fine measurement eyepiece assembly provided with an eyepiece and a measurement scale, and a microscope body tube having an objective mounted therewithin. The fine measurement eyepiece assembly is usually rotatable relative to the body tube.

Views through the eyepiece of a known measurement microscope are shown in FIGS. 1a–1c of the accompanying drawings. A measurement scale is projected within the view field of the eyepiece, and is extraneously adjustable and movable in Y- or X-direction (or in both directions).

Measurement may be effected through the procedures which will now be described. First, a sample supporting table is adjusted to move a depression in a sample to the center of the view field of the measurement microscope, whereafter the fine measurement eyepiece assembly is rotated to register a diagonal of the depression with the direction of the scale (see FIG. 1a). The fine adjustment scale is then set to its zero position (so-called zero setting), and subsequently a point p on the diagonal is registered with a scale mark of the measurement scale (see FIG. 1b), whereupon the diagonal length pr is read out up to the minimum unit of the scale divisions (in the shown case, up to the unit of $10\mu$). Further, the fine adjustment scale is moved until another point r of the depression is registered with an adjacent scale mark (see FIG. 1c), whereby the distance between said scale mark and the point r is read out. Thus, the sum of the former measurement and the latter measurement is the desired value of measurement. In the described manner, the length of one diagonal has been measured. Since the other diagonal is still left to be measured, the measurement scale must be rotated through 90° to a vertical position as indicated by dashed line in FIG. 1. For this purpose, the fine measurement eyepiece assembly is rotated to measure the length of that other diagonal again through the same procedures as described above.

In addition to the above-described procedure using the measurement microscope, there is a method using a snap wire system. This is designed such that one of two measuring wires is movable. When the two wires are registered with each other, a counter indicates a numeral 0. The measuring wires are set at right angles with one diagonal of a depression and one of the measuring wires is moved to measure the length of 1 diagonal. The other diagonal across the depression is similarly measured. Of course, in this case again, the fine adjustment eyepiece assembly must be rotated through 90° in the same manner as described with respect to the first-mentioned measurement microscope.

There are still other various types of measurement microscopes, but any of the known types requires the fine measurement eyepiece to be rotated through 90° in order to measure the other diagonal length across the depression. Also the former type involves the zero setting of the fine adjustment scale prior to measurement and any inaccurate zero setting would result in a great error of the resultant measurement value and thus a very unstable accuracy of measurement.

In the latter type, measurement is easy to effect when the depression appearing in the view field of the eyepiece is of a predetermined size, but if depressions of various sizes are to be measured successively, the measuring wires must be widely displaced, thus greatly reducing the work efficiency.

SUMMARY OF THE INVENTION

We have conceived a measurement microscope by which we have been able to eliminate all the above-noted disadvantages existing in the conventional measurement microscopes.

Thus, the measurement microscope of the present invention comprises an eyepiece assembly including an eyepiece, and a microscope body tube including an objective optically aligned with the eyepiece. The eyepiece assembly is rotatable relative to the microscope body tube. The eyepiece assembly comprises an outer frame member having the eyepiece secured therewithin, a movable member connected to the outer frame member by means of dovetail and dovetail groove and slidable relative to and within the outer frame member in a first direction perpendicular to the optical axis of the eyepiece, an intermediate frame member connected to the movable member by means of dovetail and dovetail groove and movable relative to the movable member in a second direction perpendicular to the optical axis of the eyepiece and to the first direction of movement, and an inner frame member connected to the intermediate frame member by means of dovetail and dovetail groove and movable relative to the intermediate frame member in the second direction. Two transparent scale plates are secured to the intermediate and inner frame members, respectively. These scale plates have scale marks formed therein so as to register with an image plane in which the image of a sample is formed by the objective. The scale marks of the two scale plates are arranged in two orthogonal directions which form an angle of 45° with the first and second directions. The movable member, the intermediate and the inner frame member are all extraneously adjustable and movable.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as to not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIG. 2 is a vertical cross-section of the measurement microscope according to the present invention;

DESCRIPTION OF THE PREFERRED EMBODIMENTS

Figure 1A:
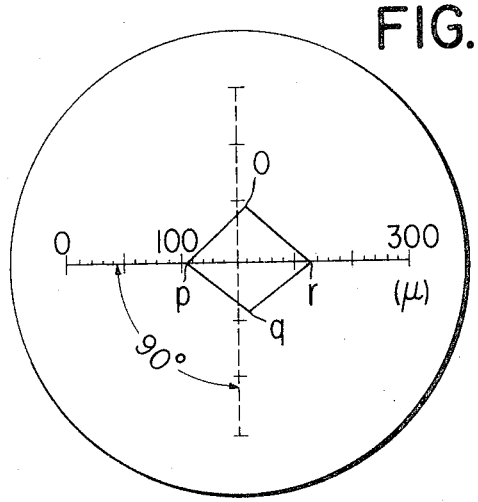
FIGS. 1a, 1b and 1c show the view field of the conventional measurement microscope as observed through the eyepiece thereof.
Figure 1B:
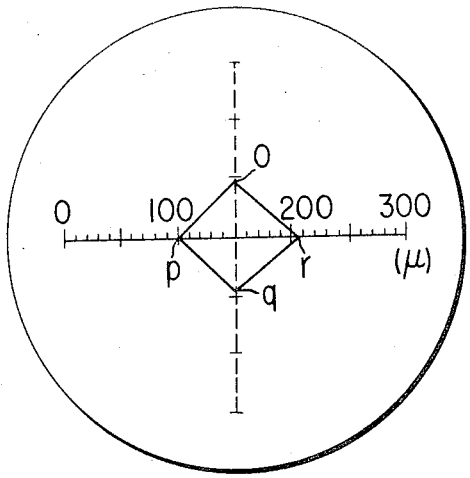
Figure 1C:
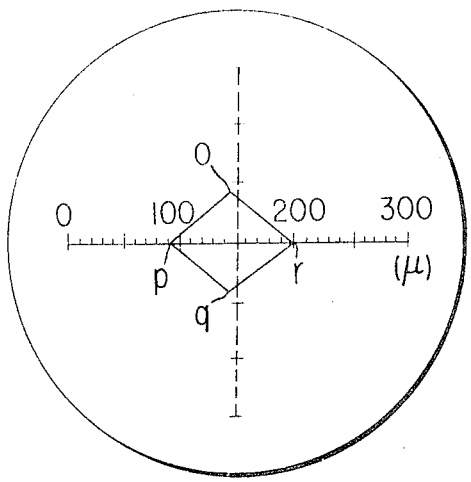
Figure 3:
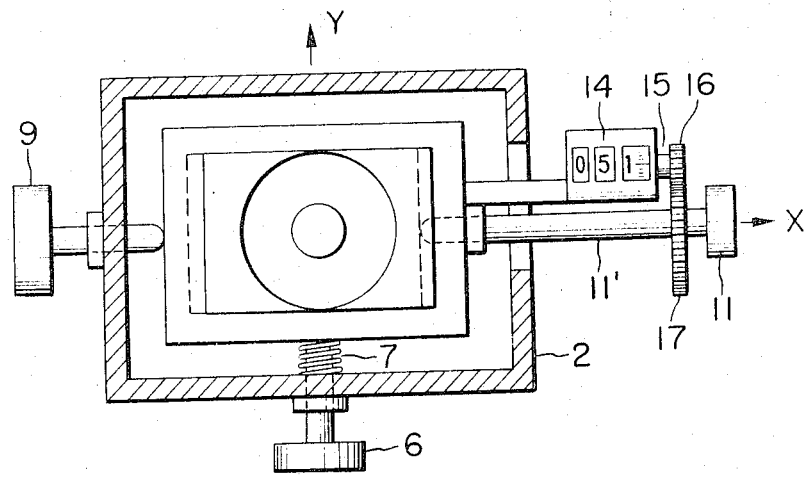
FIG. 3 is a sectional view taken along line III—III of FIG. 2.

Referring to FIGS. 2 and 3, the measurement microscope of the present invention includes an eyepiece 1 secured in an outer frame 2 which intercepts any light from outside. The microscope further includes a microscope body tube 3 within which is mounted an objective 3' which, in this embodiment, may be of magnification 30, for example. The outer frame 2 is rotatable relative to the microscope body tube 3 and about a common optical axis $a$. Numeral 4 designates a clamp for securing a fine measurement eyepiece assembly in any desired position.

A movable base plate 5 is formed as a dovetail and is received in a dovetail groove formed in the outer frame 2. The base plate 5 is movable in a predetermined direction (hereinafter referred to as Y-direction) perpendicular to the optical axis $a$ of the eyepiece by the rotation of a Y-direction knob 6 and by the force of a tension spring 7. An intermediate frame 8 is formed as a dovetail and is received in a dovetail groove provided by the movable base plate 5. The frame 8 is movable in a direction (X-direction), perpendicular to the Y-direction, by the rotation of an X-direction knob 9 and by the force of a tension spring (not shown). An inner frame 10 is formed as a dovetail and is received in a dovetail groove provided by the intermediate frame 8. The inner frame 10 is movable in the X-direction by the rotation of a measuring knob 11 and by the force of a tension spring (not shown).

Glass scale plates 12 and 13 are securely provided in the intermediate and inner frames 8 and 10, respectively. These glass scale plates are located in such positions that their scale mrks and the image of a sample to be measured can be simultaneously observed when the operator looks through the eyepiece with the marked surfaces of the scales being aligned with an image plane in which the image of the sample surface is formed through the objective 3'. The glass scale plate 12 is formed with groups of scale marks $a_1, a_2, a_3$; $b_1, b_2, b_3$; and $c_1, c_2, c_3$ (see FIG. 4).

These groups of scale marks are parallel and spaced apart from one another by 3 mm. This distance of 3 mm corresponds to $100\mu$ on a sample body because the objective 3' is of magnification 30. Each group of scale marks is at an angle of 45° with the X- and Y-directions which are the directions of scale movement.

The other glass scale plate 13 is also formed with groups of scale marks $a'_1, a'_2, a'_3$; $b'_1, b'_2, b'_3$; and $c'_1, c'_2, c'_3$, as indicated by respective broken lines in FIG. 4, although actually these are solid lines. These groups of scale marks are located in symmetrical relationship with those of the glass scale 12.

A display counter 14 is secured to the intermediate frame 8 and is disposed outwardly of the outer frame 2. The counter 14 has a rotary shaft 15 on which a gear 16 is securely mounted and meshes with a gear 17 securely mounted on a measuring shaft 11'. Rotation of the measuring knob 11 will move the glass scale plate 13 in the X-direction and, at the same time, will vary the display of the counter 14. The counter 14 is designed such that it displays 0 when the marks $a_2$ and $a'_2$ are in registry, and the gears 16 and 17 are designed such that three full rotations of the measuring knob 11 represents $100\mu$.

Description will now be made of the measuring procedures involved when the above-described device of the present invention is used as a measurement microscope attached to a hardness meter.

Figure 4:
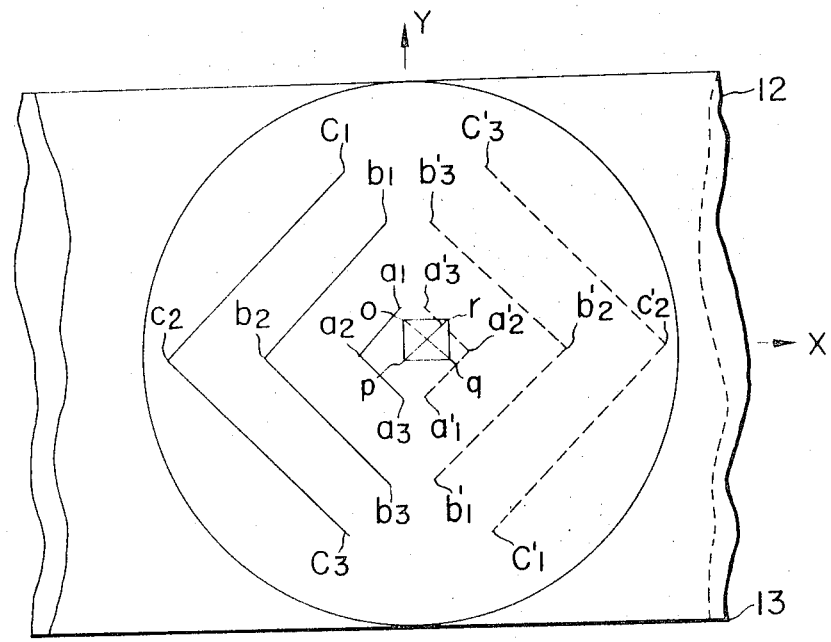
FIG. 4 illustrates the measuring method carried out by the present invention.

First, a depression is formed in the test surface of a sample through prescribed procedures, whereafter the sample supporting table is moved or the relative position of the press member and the microscope is changed so that the formed depression lies right below the microscope. When the depression appears in the view field of the microscope, the fine measurement eyepiece assembly is bodily rotated about the optical axis $a$ of the eyepiece 1 until the two diagonals to be measured are at right angles with the scale marks of the scales 12 and 13. Such position is shown in FIG. 4.

Subsequently, the X-direction knob 9 and the Y-direction knob 6 are rotated to move the glass scale 12 so as to register the scale marks $a_1a_2$ with the point $o$ of the depression image $opqr$. The measuring knob 11 is then rotated to move the glass scale plate 13 so as to register the scale marks $a'_1a'_2$ with the point $q$ of the depression image, whereupon the counter 14 displays a diagonal length $oq$ in the depression. To measure the other diagonal length $pr$, the X-direction knob 9 is rotated to register the scale marks $a_2a_3$ of the glass scale plate 12 with the point $p$ of the depression image, whereafter the measuring knob 11 is rotated to register the scale marks $a'_2a'_3$ of the glass scale with the point $r$ of the depression image, whereupon the display on the counter 14 is read out.

Where a larger depression is to be measured, this may be accomplished as by suitably using the scale marks $b_1b_2b_3$ or $c_1c_2c_3$ of the glass scale plate 12 and the scale marks $b'_1b'_2b'_3$ or $c'_1c'_2c'_3$ of the glass scale plate 13.

Where the scale marks $b_1b_2b_3$ and $b'_1b'_2b'_3$ are used, the size of the depression is of a value equal to the sum of the counter-displayed value plus $200\mu$. Where the scale marks $c_1c_2c_3$ and $c'_1c'_2c'_3$ are used, the size of the depression is of a value equal to the sum of the counter-displayed value plus $400\mu$.

The problem of errors will now be considered. For example, it is assumed that the threaded portions of the intermediate frame 8 and the measuring shaft 11' are Whitworth coarse threads of nominal size W5/16. These threads have 18 crests per 25.4 mm (1 inch) and a pitch of $25.4/18 \div 1.4111 \div \sqrt{2}$.

Thus, when the measuring knob 11 has made three full rotations, the glass scale plate 13 is moved over $25.4/18 \times 3 = 25.4/6$ mm, so that the scale marks $a'_1a'_2$, $a'_2a'_3$, etc. are respectively moved over $25.4/6 \sqrt{2}$ mm in the direction perpendicular to the scale marks (i.e. the direction forming an angle of 45° with the X- or Y-direction).

Since the magnification of the objective 3' is 30, the aforesaid distance $25.4/6 \sqrt{2}$ mm corresponds to a distance $25.4/6 \times 30 \times \sqrt{2} \div 0.09978$ mm ($99.78\mu$) on the sample object, thus providing an error of only 0.22 percent with respect to the value $100\mu$ displayed by the counter 14. In most cases, such an extent of error is negligible.

Where further precision is required, the magnification of the objective 3' may be reduced by a percentage necessary for correcting the above-mentioned error, i.e. by 0.22 percent of the magnification 30 (namely, 0.66 magnification), thus eliminating the error.

In the above-described embodiment of the present invention, the outer frame 2 and the movable base plate 5 are in dovetail to dovetail-groove relationship and the movable base plate 5 and the intermediate frame 8 securely provided with the glass scale 12 are also in a similar relationship, whereas it will be apparent that the same result as described may be achieved by arranging on the outer frame 2 horizontally movable members instead of the base plate 5 and the intermediate frame 8.

According to the described construction of the present invention, as in the case of a measurement microscope used with a Vickers' hardness meter, the fine measurement eyepiece assembly may initially be rotated to such a position in which the scale marks are perpendicular to the diagonals in a depression to be measured, and one it is clamped in such position, the Y-direction knob 6 may be rotated so that the X-axis of the scale surface (the line passing through marks $c_2, b_2, a_2, a'_2, b'_2$ and $c'_2$) is aligned with the position in which the depression appears, whereby the operation for the 90° rotation of the fine measurement eyepiece assembly may become unnecessary during the subsequent measurement of the depression. In addition, both the operation for the zero setting of the scales and the operation for moving the Y-direction knob 6 may also be eliminated and the measurement of the two orthogonal diagonal lengths can be accomplished simply by operating the X-direction knob 9 and the measuring knob 11.

This reduces the measurement error which would be caused by any inaccuracy of the perpendicular relationship provided between the scale marks and the diagonals of the depression, and thus eliminates the occurrence of any measurement error which would otherwise result from imperfect zero setting, thereby enhancing the accuracy of measurement.

Also, the simplified procedures for operation lead to quicker measurement. Especially, when the present invention is applied to a Vickers' hardness meter or the like, only a slight angular rotation of the X-direction knob 9 and of the measuring knob 11 is required between the measurement cycle for one of two diagonal lengths in a depression and the measurement cycle for the other diagonal length because the two diagonal lengths are substantially equal.

Where hardness is to be measured at three or more points successively under the same conditions as is often the case, the size of the depression at the second and subsequent points is about the same as that at the first point and the depression is formed substantially at a predetermined position within the view field, and therefore measurement of the depression at the second and the third point may again be accomplished simply by very slight angular rotation of the X-direction knob 9 and of the measuring knob 11, thus ensuring the measurement to be effected very quickly.

Further, continuous measurement of depressions of various sizes may be accomplished by using those of the scale marks which are nearest in size to the sizes of the depressions, in which case the displacement of the scale marks may be about one half ($\approx 50\mu$) of the distance between adjacent groups of scale marks and accordingly, the X-direction knob 9 and the measuring knob 11 will only have to make about one and one-half rotation. This in turn means that the read-out of the measured value may be effected merely by adding a simple integer such as $200\mu$ to $100\mu$ appearing in the display counter, thus avoiding the trouble in the read-out.

It will further be noted that the stationary eyepiece provides a constant view field which ensures a depression to be imaged at a predetermined position within the view field. Therefore, hardness of a sample at any point thereof can be freely measured by reversing the procedures, i.e., by forming a depression after having moved the sample so that the area thereof to be measured as to hardness is brought to the predetermined position within the view field.

We believe that the construction and operation of our novel measurement microscope will now be understood, and that the advantages thereof will be fully appreciated by those persons skilled in the art.

We claim:

1. A measurement microscope comprising:
   an eyepiece assembly including an eyepiece; and
   a microscope body tube including an objective optically aligned with said eyepiece, said eyepiece assembly being rotatable relative to said microscope body tube;
   said eyepiece assembly comprising:
   an outer frame member having said eyepiece secured therewithin;
   a movable member mounted in said outer frame member for slidable movement relative to and within said outer frame member in a first direction perpendicular to the optical axis of said eyepiece;
   an intermediate frame member mounted on said movable member for movement relative to said movable member in a second direction perpendicular to said optical axis and said first direction;
   an inner frame member mounted on said intermediate frame member for movement relative to said intermediate frame member in said second direction; and
   two transparent scale plates secured to said intermediate frame member and said inner frame member, respectively, said scale plates bearing scale marks so as to register with an image plane in which the image of a sample is formed by said objective, said scale marks of said two scale plates being arranged in two orthogonal directions forming an angle of 45° with said first and second directions;

said movable member, said intermediate and said inner frame member being extraneously adjustable and movable.

2. A measurement microscope according to claim 1, in which a counter is secured to said intermediate frame member, the counter being positioned externally of the outer frame member, a measuring knob being provided to move the scale plate on the inner frame member, and means transmitting the rotational movement of the measuring knob to the counter to express the moving distance of the scale plate.

* * * * *